Figure 1:
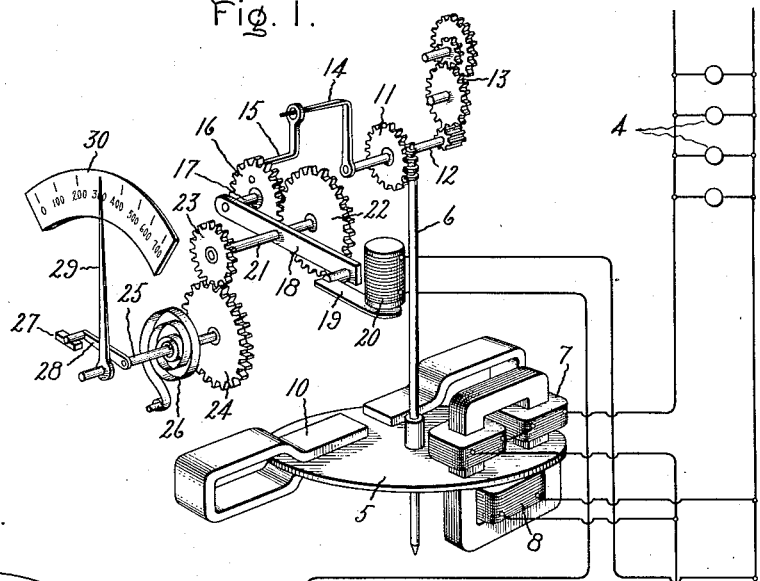

C. G. DURFEE.
MAXIMUM INDICATOR.
APPLICATION FILED JULY 20, 1912.

1,167,157.

Patented Jan. 4, 1916.

Witnesses:
George W. Tilden

Inventor:
Charles G. Durfee,
by
His Attorney.

UNITED STATES PATENT OFFICE.

CHARLES G. DURFEE, OF ROCHESTER, NEW YORK, ASSIGNOR TO GENERAL ELECTRIC COMPANY, A CORPORATION OF NEW YORK.

MAXIMUM-INDICATOR.

1,167,157.   Specification of Letters Patent.   Patented Jan. 4, 1916.

Application filed July 20, 1912. Serial No. 710,545.

*To all whom it may concern:*

Be it known that I, CHARLES G. DURFEE, a citizen of the United States, residing at Rochester, county of Monroe, State of New York, have invented certain new and useful Improvements in Maximum-Indicators, of which the following is a specification.

My invention relates to maximum indicators, and in particular to a maximum demand indicator in combination with an electric meter connected to an alternating current circuit.

The object of my invention is to provide in combination with an alternating current system a maximum indicator adapted to indicate the maximum quantity of energy metered during any one of a number of intervals of time, and an alternating current motor for determining the intervals of time.

A further object of my invention is to provide in such a combination an alternating current motor which is substantially independent of voltage fluctuations of the system, and to this end I preferably employ a synchronous motor.

A further object of my invention is to provide a maximum indicator which is simple in construction and accurate in operation, and which is adapted to indicate the maximum speed of rotation of a revolving shaft during any one of a number of equal intervals of time.

Another object of my invention is to provide a definite time lag at the end of each equal time interval, in order that the maximum indicating mechanism may have sufficient time to resume its initial or zero position at the end of each cycle of operation.

I accomplish the objects of my invention by operatively connecting the revolving shaft, whose maximum speed of rotation it is desired to ascertain, to an actuator adapted to move a non-return pointer. The actuator is returned to an initial or zero position at regular intervals of time. These time intervals are marked or determined by a constant speed motor of the character hereinafter specified. In the more specific embodiment of my invention, I attach the maximum indicating mechanism to the revolving shaft of an electric meter which latter is connected to an alternating current supply line for measuring the energy supplied to the translating devices of the system. An alternating current motor whose speed is independent of the voltage fluctuation of the system is also connected to the supply line and acts to determine the equal time intervals for the maximum indicating mechanism.

The novel features which I believe to be characteristic of my invention will be definitely indicated in the claims appended hereto.

The features of construction and mode of operation will be understood by reference to the following description taken in connection with the accompanying drawings which show the preferred embodiments of my invention, and in which—

Figure 2:
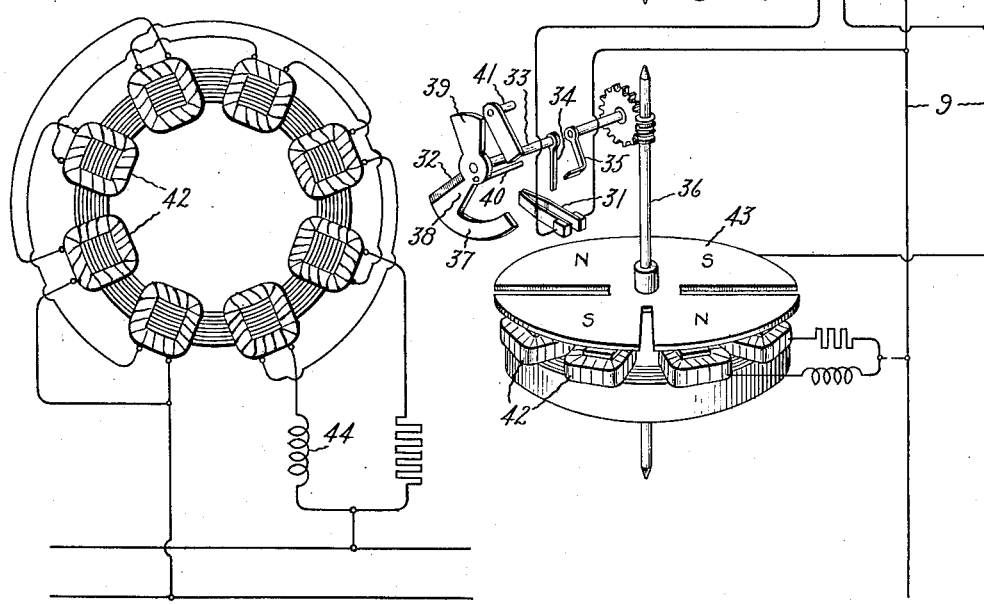

Figure 1 shows diagrammatically the novel features of my invention in connection with an induction wattmeter; and Fig. 2 is a diagrammatic view of the field windings of the synchronous motor.

Referring to Fig. 1, I have shown diagrammatically an induction wattmeter comprising the rotatable disk 5 and fixed thereto the meter shaft 6. The rotating field of the meter is produced by the usual series coils 7 and potential coil 8, which coils are suitably connected to an alternating current supply line 9. Dampening magnets 10 retard the rotation of the disk 5 in the well known manner. The supply line 9 furnishes current to translating devices 4 which may be of any desired character.

The meter shaft 6 drives a gear 11 which is secured to a shaft 12. The shaft 12 at one end drives a gear train 13 operatively connected to the usual counter mechanism of the meter. Such counter mechanism is not shown in the drawings, as it forms no part of my invention. At the other end of the shaft 12, an L-shaped arm 14 is rigidly secured. This arm coöperates with a crank arm 15 of the gear 16 which is mounted for rotation on a shaft 17. The shaft 17 acts as a pivot for one end of a lever arm 18. The other end of this arm 18 carries an armature 19 of an electromagnet 20. Intermediate the ends of the lever arm 18 is secured a shaft 21 which is adapted to be rocked through a small angle by the lever arm. The shaft 21 carries at one end a gear 22 which is always in mesh with the gear 16 and at the other end a gear 23 which normally meshes with a gear 24, mounted on a shaft 25. A spring 26 normally tends to rotate the shaft 25 in one direction, and the amount of rotation in this direction is limited by a fixed stop 27 coöperating with an actuator or dog 28 secured to the shaft 25. The stop 27 and actuator 28 thus give the shaft 25 an initial or zero position. The actuator 28 is provided with a lug which operates to move a non-return pointer 29 over a suitable scale 30.

The circuit of the electromagnet 20 is connected across the line 9, and is provided with fixed spring contacts 31. These contacts are normally separated, and the electric circuit is adapted to be completed by a contact-maker 32 mounted for rotation on a shaft 33. The shaft 33 carries an arm 34 which lies in the path of a dog 35 driven by the shaft 36 of a constant speed alternating current motor. In the drawings I have shown diagrammatically a synchronous motor connected to the same supply line as the induction meter, and I preferably employ this type of motor since its speed is substantially independent of voltage fluctuations of the supply line.

The contact-maker 32 is of peculiar construction, and comprises a sector-shaped contact member 37 mounted on a radial arm 38. The front portion of this radial arm is provided with a chisel edge to permit an easy ingress between the spring contacts 31. A counterweight arm 39, shorter than the arm 38, is also provided. A pin 40 and a pawl 41 prevent rotation of the contact-maker in a reverse direction after the latter has fallen by gravity to its lowermost position.

The synchronous motor is of ordinary construction and comprises the field poles 42 and the revolving disk armature 43. The armature is a permanent magnet having alternate north and south poles. An inductance 44 is included in one of the circuits of the field winding in order to render the motor self-starting. As shown in the figure, this motor may be directly connected across the main lines 9.

The operation of my device is as follows:—The pointer 29 is moved manually to its initial or zero position which is determined by its engagement with the actuator 28, when the latter rests against the stop 27. The electromagnet 20 being deenergized, the gear 23 will mesh with the gear 24, and the rotation of the meter shaft 6 will be transmitted to the shaft 25. The actuator 28 revolving with the shaft 25 in a clockwise direction will move the pointer 29 over the scale 30. The disk armature 43 of the synchronous motor revolves at a constant speed and through its shaft 36, and the connecting mechanism, rotates the contact-maker 32 in a clockwise direction. When the sector-shaped member 37 of the contact-maker reaches the highest point in its path, it approaches its critical state of equilibrium, and passing this point it falls by gravity, due to the weight of the member 37. In falling, the sector 37 passes between the fixed contacts 31 and completes the electric circuit of the electromagnet 20.

The length of the sector 37 is such that the circuit is closed an appreciable and definite length of time so that the maximum demand mechanism may have sufficient time to return to its initial position. The spring contacts 31, furthermore, exert a braking action on the contact-maker by their engagement with the sector 37, and thus retard the passage of the latter through the contacts. Oscillation of the contact-maker, after its passage through the fixed contacts 31, is prevented by the pawl 41 which engages with the pin 40. In this manner the contact-maker is prevented from swinging back and again closing the circuit of the magnet.

The armature 19 is attracted by the energized magnet 20, and rocks the shaft 21 so as to disengage gears 23 and 24. Spring 26 then operates to return the shaft 25 and the actuator 28 to their initial positions which are determined by the stop 27. The electromagnet 20 now being deënergized, the gears 23 and 24 will again be in mesh and the cycle of operation just described will be repeated. The pointer 29 remains at the position to which it is moved by the actuator 28, and will thus indicate the maximum extent to which it has been moved during any one time interval.

Since the armature 43 of the synchronous motor revolves at a constant speed, it is evident that the circuit through the electromagnet is completed at definite time intervals. In this way, the pointer 29 will indicate the maximum speed of rotation of the shaft 6 during any one of these intervals.

Although I have illustrated my maximum indicator in connection with an electric meter, it is evident that it can be used to indicate the maximum speed of rotation of any rotating shaft. It is further evident that the objects of my invention may be accomplished by the use of my alternating current motor whose speed is independent of voltage fluctuations, and I do not, therefore, wish to be restricted to the synchronous motor which I have illustrated in the drawings.

What I claim as new and desire to secure by Letters Patent of the United States, is,—

1. The combination with a rotatable shaft of a maximum indicator comprising an actuator having an initial position, means for operatively connecting said rotatable shaft to said actuator, electromagnetic means including an electric circuit adapted to interrupt the operative connection between said rotatable shaft and said actuator, means adapted to return said actuator to its initial position when the operative connection between the rotatable shaft and the actuator is interrupted, a fixed contact in said electric circuit, a rotatable sector-shaped contact-maker coöperating with said fixed contact to complete said electric circuit, means for positively rotating said contact-maker through half a revolution, means whereby said contact-maker is urged by gravity to complete the other half of its revolution thereby engaging said fixed contact, the length of the contact surface of said contact-maker being such that said electric circuit is maintained completed until said actuator has returned to its initial position, and means for indicating the maximum movement of said actuator.

2. The combination with a rotatable shaft of a maximum indicator comprising an actuator having an initial position, means for operatively connecting said rotatable shaft to said actuator, electromagnetic means including an electric circuit adapted to interrupt the operative connection between said rotatable shaft and said actuator, means adapted to return said actuator to its initial position when the operative connection between the rotatable shaft and the actuator is interrupted, a fixed contact in said electric circuit, a rotatable sector-shaped contact-maker adapted to coöperate with said fixed contact to complete said electric circuit, means for positively rotating said contact-maker through half a revolution, means whereby said contact-maker is urged by gravity to complete the other half of its revolution thereby making contact with said fixed contact, the length of the contact surface of said contact-maker being such that said electric circuit is maintained completed until said actuator has returned to its initial position, means for preventing a rebound of said contact-maker after its action in response to gravity, and means for indicating the maximum movement of said actuator.

3. The combination with a rotatable shaft of a maximum indicator comprising a non-return pointer, an actuator adapted to move said pointer, means for normally maintaining said actuator in an initial position, a second shaft operatively connected to said rotatable shaft and to said actuator, an electromagnet, an armature for said magnet connected to said second shaft and adapted to rock said shaft through a small angle when the magnet is energized, a circuit for said electromagnet, spring contacts in said circuit, a rotatable contact-maker coöperating with said contacts, means for positively rotating said contact-maker through half a revolution, a sector-shaped contact member on said contact-maker adapted to rotate the contact-maker by gravity through half a revolution, and means for preventing a rotation of said contact-maker in a reverse direction.

In witness whereof, I have hereunto set my hand this 18th day of July, 1912.

CHARLES G. DURFEE.

Witnesses:
BENJAMIN B. HULL,
HELEN ORFORD.